Nov. 8, 1966  Y. J. TALBOT  3,283,654
STREAMLINED OUTSIDE REAR VIEW MIRROR
FOR MOTOR VEHICLES
Filed Dec. 7, 1964
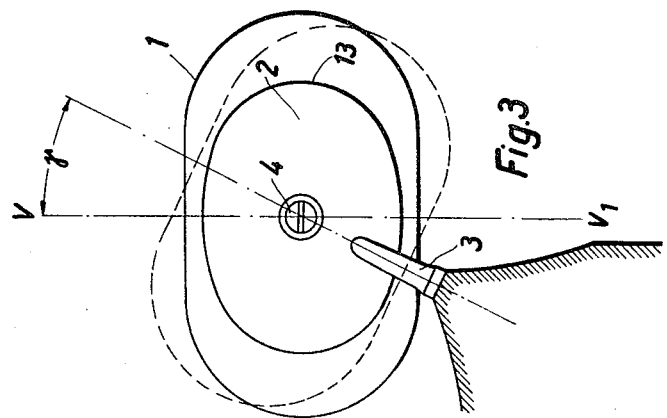
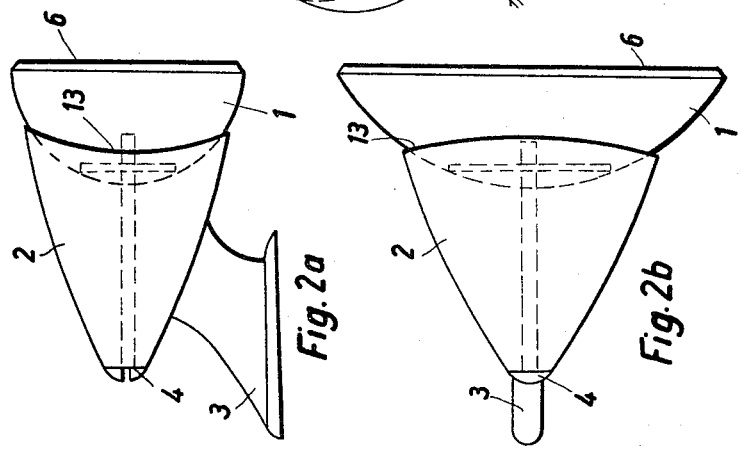
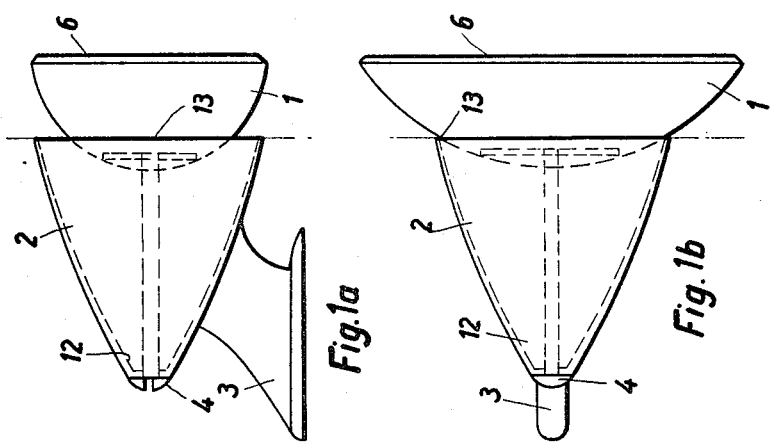
Inventor:
Jorck Joachim Talbot
by Michael S. Striker

United States Patent Office 3,283,654
Patented Nov. 8, 1966

3,283,654
STREAMLINED OUTSIDE REAR VIEW MIRROR FOR MOTOR VEHICLES
Yorck Joachim Talbot, 7 Ballenstedterstrasse, Berlin-Wilmersdorf, Germany
Filed Dec. 7, 1964, Ser. No. 416,565
Claims priority, application Germany, Dec. 10, 1963, T 25,229
2 Claims. (Cl. 88—98)

The invention relates to a streamlined outside rear view mirror for motor vehicles.

The novelty of the present invention resides essentially in the fact that the housing of the mirror is constructed as a body of rotation, flexible in itself, tapering in the direction of the motion of the vehicle and made of sheet metal or plastic of relatively small thickness, this body being shaped, by the mirror head which is pressed inwards by means of a central screw and of which the outer surface is rendered convex with two different radii, into an oval or ellipsoid fitting tightly the whole of the way round. The housing being being thus deformable according to every desired position of rotation of the mirror head, the outside rear view mirror of the present invention is usable universally both on the left and on the right of the vehicle and can be mounted in a suitable place on the body of the vehicle with equal ease with the mounting bracket either standing vertically upwards or positioned obliquely.

A further innovation resides in the fact that the wall of this mirror housing constructed as a rotatable body will, if it is to be made of plastic, for example, increase in thickness towards its front tip.

In the accompanying drawing:

FIG. 1a is a side view of the outside mirror, the mirror head and the housing just touching and thus not firmly engaging each other.

FIG. 1b is a plan view of the same mirror.

FIG. 2a is a side view of the same mirror but in the final position for use, i.e. the mirror head has been firmly drawn into the housing by tightening up the set screw and the housing has adapted itself in its shape to the mirror head.

FIG. 2b shows the same mirror, in its position for use, but as seen from the top.

FIG. 3 shows the mirror as seen from the front of the vehicle and mounted in a somewhat oblique position on an edge, indicated by a line, of the vehicle.

The outside rear view mirror to which the invention relates consists, like that of the main German patent application No. 23,994, of a mirror head 1, which is made convexffl with two different radii $r1$ and $r2$ and which accommodates the mirror glass 6, a housing 2 which accommodates this mirror head 1 in such a way that it is adjustable, and a foot or mounting bracket 3 connected with the body of the vehicle. A long screw is mounted in the tip of the housing 2, the free end of the screw being inserted in an oval counter-plate inside the mirror head 1.

As may be seen from FIGS. 1a and 1b, the rear aperture 13 of the housing 2, constructed as a body of rotation of comparatively thin material, is circular and absolutely plane, this being made clearer by a broken connecting line. Now if the mirror head 1, which is rounded with two different radii, is inserted loose in the circular orifice 13 of the housing 2, it will first of all contact it with its large radius $r2$ and only at two points horizontally opposite each other, apertures approximately of the shape of a half-moon being left free at the top.

If the central set screw 4 is tightened up, the mirror head 1 is drawn into the circular aperture 13 of the flexible housing 2, and the latter is widened out considerably in the horizontal direction, but flattened in the vertical direct ion. In the final position, therefore, the aperture 13 of the housing forms an oval which adapts itself to the external shape of the mirror head 1; in other words, the whole of its edge rests tightly against the mirror head 1. Owing to this deformation to an oval, edge 13 of the housing now appears concave when seen from the side (FIG. 2a) and convex when seen from the top (FIG. 2b).

As the housing 2, in accordance with the invention, is constructed as a body of rotation which is circular everywhere, open at one end, of relatively limited wall thickness and of correspondingly great flexibility, so that it can be compressed into an oval with equal ease in any desired direction, an outside rear view mirror in accordance with the present invention is fully universal in its applicability; that is to say, it is equally suitable for mounting on the right-hand side of the car or on the left-hand side and in an upright position or at any desired angle.

FIG. 3 of the drawing, for example, shows a left-hand side edge of a vehicle with the present typical contours involving a number of sharp angles. The mounting bracket 3 is screwed, at an angle $\gamma$ in respect of the vertical, onto an upper narrow surface sloping away towards the outside. The present invention makes it possible in this case, to rotate the mirror head 1 from its oblique position, indicated by the broken line, into the horizontal position, indicated by the continuous line, the housing 2 and its rear orifice 13 being at the same time deformed into an oval. With equal ease however, the mirror head 1 can be rotated into any other desired position in relation to the mounting bracket 3, and in any such position the position of the whole of the mirror head in relation to the housing 2 can be adjusted in an inward, outward, upward, or downward direction.

In order to illustrate the principle of the present invention as simply and clearly as possible, the open edge 13 of the housing 2 has not been provided in the usual manner with a soft rubber or plastic frame to protect the shiny surface of the mirror head 1 from scratches. In practice, however, it is advisable to do this, and a frame of this kind also provides a better sealing for the housing 2 towards the outside, without detracting from the flexibility and deformability of the housing 2.

Finally, it should be mentioned that the rear aperture 13 of the housing 2 need not necessarily be at right angles to the central axis of the housing. On the contrary, the housing 2 can also be cut at an angle $\alpha$ in respect of its central axis, without losing its already described deformability towards all sides into an oval.

For the sake of completeness, FIGS. 1a and 1b in the accompanying drawing must once again be reverted to:

To ensure that the housing 2, according to the present invention, will be sufficiently flexibile to be shaped into an oval adapted to the mirror head 1, no matter into what position it is rotated, it will generally be sufficient, when the rotatable body is made of sheet metal, to select a material that is not too thick and to give the body of rotation a constant and relatively small wall thickness at every point on its surface.

If, however, the housing 2 is to be made of plastic, for example, instead of sheet metal, as is expressly contemplated by way of an alternative in the present invention, it might be desirable in certain cases to provide the wall of the housing 2 with a conical reinforcement 12 increasing towards the tip, as indicated by broken lines in FIGS. 1a and 1b. In practice the result of this conical shape would be that the housing 2 would have a particular degree of flexibility and deformability in the zone of its rear aperture 13, while tending, towards its tip, to retain its original circular cross section.

I claim:

1. A rear view mirror for automotive vehicles, comprising mounting means for mounting the mirror on the body of a vehicle; a hollow housing of at least partially resilient and deformable material having an end provided with an opening bounded by an internal surface; a mirror head having a dome-shaped curved convex rear portion of non-spherical shape, said rear portion extending through said opening into said housing; and draw-in means for drawing said mirror head into said opening to thereby effect resilient deformation of said housing in the region of said opening into conformity with the outline of said rear portion so that said internal surface tightly engages corresponding surface portions of said mirror head and establishes a seal therewith.

2. A rear view mirror for automotive vehicles, comprising mounting means for mounting the mirror on the body of a vehicle; a hollow housing of resiliently deformable material tapering from one toward the other end thereof, said housing having at said one end a circular opening bounded by an inner surface portion constituting a surface of revolution; a mirror head having a rear portion and a front portion incorporating a mirror element, said rear portion being of curved other-than-spherical configuration and having one transverse dimension exceeding the maximum transverse dimension of said opening, and said rear portion being received in said opening; and draw-in means drawing said rear portion of said mirror head into said opening from said one toward said other end of said housing whereby said housing is at least partially resilient and deformable in the region of said one end thereof into conformance with the configuration of said rear portion, said draw-in means retaining said mirror head in said opening with freedom of rotation in engagement with said surface of revolution.

References Cited by the Examiner
UNITED STATES PATENTS 2,882,793  4/1959  Petri et al. _____ 88—98 X

FOREIGN PATENTS 1,734,957  11/1956  Germany.
1,748,086  7/1957  Germany.

JEWELL H. PEDERSEN, *Primary Examiner.*

O. B. CHEW, *Assistant Examiner.*